United States Patent [19]
Beekenkamp

[11] 4,212,542
[45] Jul. 15, 1980

[54] FRONT END LOADING TRANSIT MIXER

[75] Inventor: Gerald Beekenkamp, Mississauga, Canada

[73] Assignee: London Concrete Machinery Co. a division of Hodgson Machine & Equipment Ltd., London, Canada

[21] Appl. No.: 20,259

[22] Filed: Mar. 14, 1979

[51] Int. Cl.² .............................................. B28C 5/20
[52] U.S. Cl. ..................................................... 366/54
[58] Field of Search ....................... 366/62, 63, 54, 56, 366/57, 58, 59, 60, 61, 220

[56] References Cited

U.S. PATENT DOCUMENTS

| | | | |
|---|---|---|---|
| 3,019,002 | 1/1962 | Prichard | 366/62 |
| 3,929,321 | 12/1975 | Sims | 366/54 |

Primary Examiner—Robert W. Jenkins
Attorney, Agent, or Firm—Fetherstonhaugh & Co.

[57] ABSTRACT

A front end loading transit mixer is provided in which the opening at the front end thereof is of an optimum diameter while the overall height of the vehicle is maintained within acceptable height limits by locating the operator's cab rearwardly of the front wheel set and laterally offset to one side of the frame of the vehicle. An unobstructed viewing opening is provided in the area extending inwardly from the front end of the frame and located above the front end portion of the frame and below the front section of the mixing drum so that the operator is afforded an unobstructed line of vision in a generally horizontal plane extending through at least 90° in each direction from the direction of forward movement of the vehicle.

4 Claims, 3 Drawing Figures

FRONT END LOADING TRANSIT MIXER

FIELD OF INVENTION

This invention relates to transit mixers. In particular, this invention relates to front end loading transit mixers of the type used for mixing and transporting concrete and the like.

PRIOR ART

For many years, transit mixers have been designed so that the concrete or other aggregate is loaded into and discharged from the mixing drum at the rear of the vehicle. In order to discharge a load at a job site, it is frequently necessary to reverse the vehicle into the required discharge location. At many construction sites it is necessary to ensure that a single man is available to assist the driver in backing up and to prevent other personnel from crossing the path of the vehicle as it is driven backward.

Front end loading transit mixers have been designed with a view to simplifying the manoeuvering of a transit mixer into a position in which the loading end is located in the required location. Considerable difficulty has been experienced in the design of front end loading transit mixers because of statutory or conventional height restrictions for road going vehicles. In this respect, it is generally required that the road going vehicle should have an overall height of less than thirteen feet and it is generally customary to limit the overall height to no more than twelve feet ten inches. With the driver cab of a transit mixer located in the conventional position disposed above the axle of the front wheels, considerable difficulty is experienced in attempting to maintain the required height restriction while extending the concrete mixer above the operator cab. As a result, it has been necessary to reduce the diameter of the opening through which the mixer drum is loaded and discharged to effect a reduction in the overall height. In a standard rear discharge mixing drum, the loading/discharge opening measures about forty three inches in diameter. An opening measuring forty three inches in diameter has been shown to provide rapid charging of the mixing chamber. In the known front end loading transit mixers described above, it has been necessary to reduce the diameter of the loading opening to about thirty six inches. This reduction in diameter considerably increases the charging and discharging time with coarse aggregate. As a result of the difficulties experienced in charging front end loading transit mixers these mixers have not gained wide acceptance and are not widely used.

In order to overcome this difficulty, consideration has been given to the possibility of locating the operator cab in front of the front axle at a lower level. With the cab located in this position, the driver operator is in a very vulnerable position in the event of a front end collision and is generally positioned very close to the discharge stream of aggregate.

From the foregoing discussion of the previous attempts to provide front end loading transit mixers, it will be apparent that the designers have attempted to gain the advantages to be derived from front end loading and discharge of a transit mixer while in the process sacrificing the efficiency with which conventional rear discharge mixing drums may be charged and discharged by accepting that it is necessary to reduce the diameter of the discharge opening in order to remain within the overall height requirements.

The front end loading transit mixer of the present invention provides a mixing drum which may have an input passage of a sufficient diameter to permit charging of aggregate at a rate equal to that of a standard rear end loading mixer while permitting the mixing drum to be mounted so that the overall height thereof does not exceed the conventional standard height.

SUMMARY OF INVENTION

According to one aspect of the present invention, there is provided a front end loading transit mixer for use in transporting and mixing concrete and the like comprising a frame having a front end portion and a back end portion and a longitudinal axis extending therebetween, said front end portion having first and second sides disposed one on either side of said longitudinal axis, front and back road going wheel sets supporting said frame at the front and back portions thereof, respectively, a longitudinally elongated mixing drum having a front end and a back end, a mixing chamber formed within said drum, an opening at the front end of said mixing drum through which concrete may be loaded into or discharged from said mixing chamber, an axis of rotation extending longitudinally between said front and back ends, a front section of said mixing drum having a longitudinally elongated truncated conical shape extending rearwardly from and increasing in diameter in a direction rearwardly from said front end, mounting means on said frame supporting said mixing drum for rotation about said axis of rotation with its back end disposed above said back end portion of said frame and its front end portion disposed above said front end portion of said frame, and said axis of rotation inclined upwardly in a direction toward the front end portion of said frame such that the front end of the mixing drum is spaced a substantial distance above the front end portion of the frame whereby a substantially unobstructed viewing opening is provided in the area extending inwardly from the front end of the frame and located above the front end portion of the frame and below the front section of the mixing drum, an operator cab having an operator station therein, said cab being mounted on the front end portion of said frame so as to locate the operator station rearwardly from the front wheel set and laterally offset on the first side of said longitudinal axis, said cab being adapted to afford said operator, when in said operator station, a substantially unobstructed line of vision toward said second side of said frame in a generally horizontal plane extending through said viewing passage over an angle of at least 90° from the direction of forward movement of the road going wheeled frame as viewed from the operator station.

The invention will be more clearly understood after reference to the following detailed specification read in conjunction with the drawings, wherein.

Figure 1:
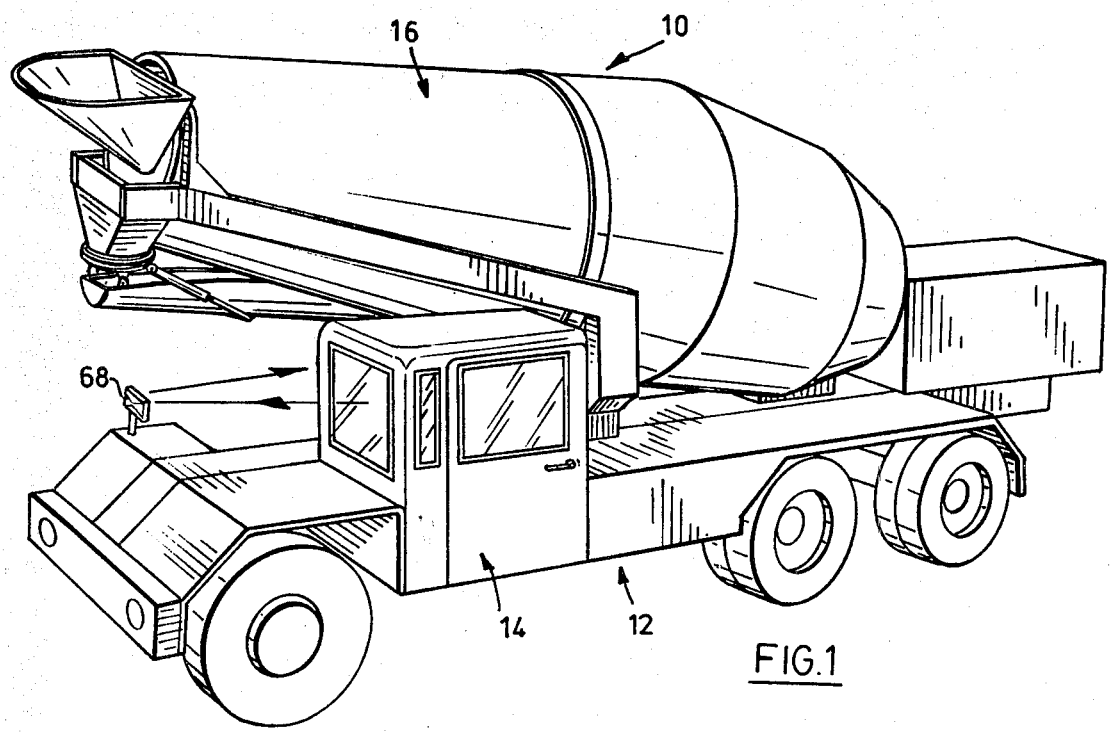
FIG. 1 is a pictorial front view of a transit mixer viewed from the road side thereof.
Figure 2:
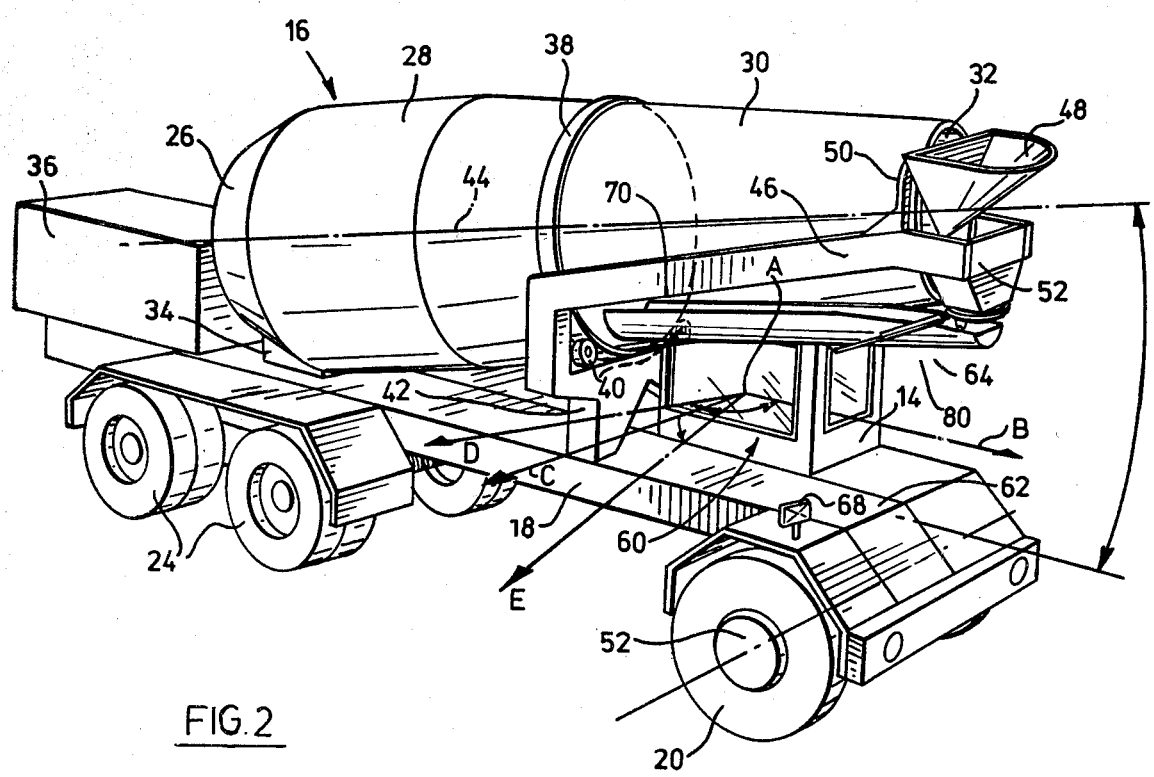
FIG. 2 is a pictorial front view of the transit mixer of FIG. 1 viewed from the curb side thereof.

With reference to the drawings, the reference numeral 10 refers generally to a front end loading transit mixer constructed in accordance with an embodiment of the present invention. The transit mixer 10 consists of a frame 12, an operator cab 14, a mixing drum 16 and a mounting for mounting the mixing drum 16 on the frame 12.

The frame 12 is in the form of a conventional truck chassis including a pair of longitudinally extending main beams 18 on which a front wheel set 20 and a pair of rear wheel sets 24 are mounted so as to project laterally from either side thereof.

The mixing drum 16 has a closed end portion 26 at its lower end which is connected to a cylindrical shaped portion 28 and a frusto-conical shaped front section 30. The frusto-conical shaped front section 30 has an opening 32 at the front end thereof through which concrete aggregate and the like may be loaded into and discharged from the mixing chamber formed within the mixing drum. The mixing drum has conventional mixing blades extending within the mixing chamber so that the concrete may be mixed as the drum is rotatably driven in use. It will be noted that the opening 32 in the front end of the mixing drum is disposed a substantial distance from the operator cab and above the front end of the frame of the vehicle. The mixing drum 30 is mounted on the frame 12 at the rear end thereof on a conventional drive box 34. Power is supplied to the drive box 34 from the main engine 36 which also provides for the forward propulsion of the truck. A circular band 38 of wear resistant steel extends around a portion of the front section of the mixing drum and is supported by support rollers 40 mounted for rotation on a Y-shaped yoke 42 which projects upwardly from the beam members 18. The yoke 42 cooperates with the drive box 34 to support the mixing drum 16 with its axis of rotation 44 inclined upwardly and forwardly.

For the purposes of loading and unloading the mixing drum, a cantilever support structure 46 extends forwardly from the upper end of the Y-shaped yoke 42. A loading hopper 48 is mounted on a U-shaped bracket 50 which extends upwardly from the forward end of the cantilever structure 46 and a discharge hopper 52 extends downwardly from the cantilever structure 46, the discharge hopper being arranged to receive aggregate discharge from the opening 32 in use.

The operator cab 14 is located rearwardly of the front axle 52 of the front wheel set and extends above and below the plane of the upper surface of the longitudinal beams 18 and is spaced laterally on one side of the central plane 56 of the vehicle. Preferably, the operator cab 14 is laterally displaced toward the road side of the vehicle. It will be noted that the operator cab is disposed a substantial distance rearwardly from the front end of the mixing drum and a substantial distance below the position which a conventional cab assumes when mounted directly above the front axle.

It will be noted that the mixing drum 16, its associated support structure, and the frame 12 are positioned with respect to one another so as to provide an unobstructed viewing opening generally identified by the reference numeral 60 at the area bounded by the front portion 62 of the frame and the front portion 64 of the mixing drum and the Y-shaped support yoke 42. This viewing space serves to afford the operator a substantially unobstructed view of the remote side of the vehicle. Thus, if the operator is in operating position such that observations are made from the point A, the operator will have a clear line of vision in the forward direction of the arrow B through the front window of the cab and will have an unobstructed view in the direction of the arrow C in the same plane as the arrow B, the arrow C being located at 90° from the arrow B and will also have a clear view in a direction rearwardly of the direction of forward movement in the direction of the arrow D. Furthermore, the operator will be able to look laterally downwardly in the direction of the arrow E toward the road surface, his vision in this direction being improved substantially by reason of the fact that the longitudinal frame members 18 have a width which is substantially narrower than the overall width of the wheel sets. Thus, the operator has a substantially unobstructed line of vision toward the curb side of the vehicle in a generally horizontal plane extending through the viewing passage 60 over an angle greater than 90° from the direction of forward movement (arrow B) of the road going vehicle as viewed from the operator station. In addition, the operator has an unobstructed view of the road surface closely adjacent the curb side of the vehicle.

By reason of the fact that the operator cab is located rearwardly of the front wheel set, it is possible to locate a substantial portion of it lower than the plane of the main frame and consequently it is possible to proportion the front section 30 of the mixing drum so that the opening 32 formed therein has a diameter equal to or closely approaching the optimum diameter required for rapid charging and discharging which, as previously indicated, is preferably about forty three inches. By ensuring that no obstructions are located in the space formed between the front portion of the frame and the front portion of the mixing drum, a clear viewing passage is provided for the operator which enables him to obtain a view toward the curb side of the vehicle which is superior to that of many road going vehicles. It will be noted that because the cab is located rearwardly from the front end of the vehicle, it is a simple matter to mount an appropriate rear view mirror 68 at the curb side of the vehicle which will provide the operator with a good rearward view of the curb side of the vehicle.

Figure 3:
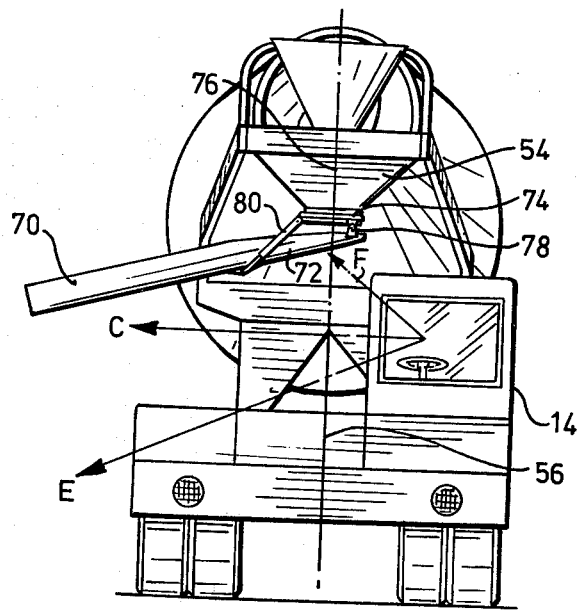
FIG. 3 is a front view of the transit mixer of FIGS. 1 and 2.

With reference to FIG. 3 of the drawings, it will be seen that a discharge chute 70 has its inner end 72 supported by a collar 74 which is mounted on the discharge end of the discharge hopper 54 for rotation about axis 76. The chute 70 is pivotally mounted at pivot pin 78 for movement in azimuth and an hydraulically actuated cylinder 80 is provided for raising and lowering the chute 70 in azimuth as required. The chute 70 is movable from a stowed position in which it extends rearwardly from the front end thereof in a side-by-side relationship with the mixing drum at a level above the level of the operator cab so that it does not restrict the operator's field of vision in the direction toward the curb side of the vehicle.

From the foregoing description of a preferred embodiment of the invention, it will be apparent that the present invention provides a front end loading transit mixer which has an input opening of an optimum diameter while retaining an overall height within the specified height limits of the order of about thirteen feet. These features are obtained by virtue of the location of the operator's cab and the provision of an unobstructed view from the cab of the remote side of the vehicle.

It will be apparent from the description of the preferred embodiment that the discharge chute may have its input end mounted very close to the discharge end of the mixing drum and in the elevated position of the chute it is well out of the line of vision of the operator. This is in sharp contrast to prior proposals for front end loading mixers in which the discharge chute and its mounting support structure has presented a substantial obstacle restricting forward vision.

It will also be noted that by reason of the fact that the operator's cab is located rearwardly of the front wheels, the vehicle enjoys a favourable approach angle, a feature which is extremely important in vehicles such as transit mixers which must be driven across uneven ground at a job site. In the previous proposals wherein the cab has been located at a low level in front of the front wheel set, the cab itself has created an obstacle which adversely affects the approach angle of the vehicle.

These and other advantages of the construction of the transit mixer of the present invention will be apparent to those skilled in the art.

The embodiments of the invention in which an exclusive property or privilege is claimed are defined as follows:

1. A front end loading transit mixer for use in transporting and mixing concrete and the like comprising;
   (a) a frame comprising longitudinally elongated main beam means extending in a first generally horizontal plane, said beam means having a front end portion and a back end portion and a longitudinal axis extending therebetween, said front end portion having first and second sides disposed one on either side of said longitudinal axis, front and back road going wheel sets supporting said frame at the front and back portions thereof, respectively, the wheels of each wheel set having an axis of rotation disposed below said first horizontal plane,
   (b) a longitudinally elongated mixing drum having; a front end and a back end, a mixing chamber formed within said drum, an opening at the front end of said mixing drum through which concrete may be loaded into or discharged from said mixing chamber, an axis of rotation extending longitudinally between said front and back ends, a front section of said mixing drum having a longitudinally elongated truncated conical shape extending rearwardly from and increasing uniformly in diameter in a direction rearwardly from said front end, said front section having a length which is at least half of the total length of the mixing drum,
   (c) mounting means on said frame supporting said mixing drum above said first plane for rotation about said axis of rotation with its back end disposed above said back end portion of said frame and its front end portion disposed above said front end portion of said frame, and said axis of rotation being inclined upwardly in a direction toward the front end portion of said frame in a first inclined plane such that the front end of the mixing drum is spaced a substantial distance above the front end portion of the frame whereby a substantially unobstructed viewing opening is provided in the area extending inwardly from the front end of the frame and located above the front end portion of the frame and below the front section of the mixing drum,
   (d) an operator cab having an operator station therein, said cab being mounted on the front end portion of said frame so as to locate the operator station rearwardly from the front wheel set and laterally offset on the first side of said longitudinal axis, said cab being adapted to afford said operator, when in said operator station, a substantially unobstructed line of vision toward said second side of said frame in a generally horizontal plane extending through said viewing passage over an angle of at least 90° from the direction of forward movement of the road going wheeled frame as viewed from the operator station.

2. A front end loading transit mixer vehicle as claimed in claim 1 including a discharge chute having an input end and a discharge end and an elongated body extending therebetween, support means supporting said chute for pivotal movement between a discharge position in which the input end is disposed below the discharge end of the drum and the output end is disposed outwardly and downwardly therefrom and a stowed position in which the elongated body extends rearwardly from the front end of the mixing drum in a side-by-side relationship with the mixing drum at a height above the viewing opening in the area extending laterally from the operator cab.

3. A front end loading transit mixer as claimed in claim 1 in which said main frame has a horizontally extending upper face, a substantial portion of the operator cab is disposed below the level of said upper face, thereby to provide a low level line of vision to the operator.

4. A front end loading transit mixer as claimed in claim 1 wherein said operator cab is spaced a substantial distance rearwardly from the opening at the front end of said mixing drum.

* * * * *